(12) United States Patent
Reason et al.

(10) Patent No.: US 6,945,059 B1
(45) Date of Patent: Sep. 20, 2005

(54) REFRIGERANT CYCLE WITH DEFROST TERMINATION CONTROL

(75) Inventors: John Reason, Liverpool, NY (US); Awwad Nader, Baldwinsville, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/936,247

(22) Filed: Sep. 8, 2004

(51) Int. Cl.$^7$ .............................................. F25D 21/08
(52) U.S. Cl. ........................... 62/155; 62/222; 62/234; 62/276
(58) Field of Search .......................... 62/151, 155, 156, 62/157, 158, 234, 182, 222, 223, 224, 225, 62/204, 205, 276

(56) References Cited

U.S. PATENT DOCUMENTS

| | | | | |
|---|---|---|---|---|
| 2,492,970 A | * | 1/1950 | Curry | 62/155 |
| 4,850,200 A | * | 7/1989 | Sugiyama | 62/156 |
| 5,285,646 A | * | 2/1994 | TaeDuk | 62/158 |
| 5,479,785 A | * | 1/1996 | Novak | 62/155 |
| 5,842,355 A | * | 12/1998 | Kalis et al. | 62/234 |

* cited by examiner

*Primary Examiner*—Harry B. Tanner
(74) *Attorney, Agent, or Firm*—Carlson, Gaskey & Olds

(57) ABSTRACT

A refrigerant cycle is provided with a transient mode for moving from a defrost cycle back to steady state operation. In particular, some default position of the expansion device is selected when defrost cycle ends. The evaporator is hot at the end of defrost cycle, and might otherwise suggest an increased flow of refrigerant through the expansion device, which could be undesirable. Thus, a control for the inventive system moves the expansion device to a defrost transient position, with the defrost transient position restricting the flow of refrigerant to a value that would be less than that dictated by the high temperature of the evaporator. At some period of time after the end of the defrost mode, the refrigerant cycle can be returned to state steady operation.

14 Claims, 1 Drawing Sheet

REFRIGERANT CYCLE WITH DEFROST TERMINATION CONTROL

BACKGROUND OF THE INVENTION

This invention relates to a control algorithm for moving from the end of a defrost transient back to steady state operation in a refrigerant cycle.

Refrigerant cycles are utilized to provide cooling, such as for refrigerant systems, or air conditioning systems. In a typical refrigerant cycle, a compressor compresses a refrigerant and delivers a hot refrigerant to a downstream condenser, which is typically located outside. From the condenser, the refrigerant passes to an expansion device at which the refrigerant is expanded and cooled. The cool refrigerant then passes into an indoor heat exchanger known as an evaporator. A fan typically passes air over the evaporator, and the air is cooled by the refrigerant. This cooled air is then passed into an environment to be conditioned.

In a standard air conditioning application, this air is brought to a temperature that is comfortable for human occupation. In refrigeration applications, the air is brought to much cooler temperatures.

One periodic maintenance function that must be performed on such a refrigerant cycle is a defrost cycle. Ice will cover the coils of the evaporator, and periodic defrosting is necessary to melt this ice. The defrost cycle may be performed by turning on a heater coil that is positioned adjacent the evaporator. Typically, when the defrost cycle has been initiated, the compressor is stopped. Further, the fan at the evaporator is stopped.

Once the defrost cycle has ended, and the heater has melted the ice on the evaporator, there is liquid water on the evaporator coils. For this reason, the fan is not typically started immediately when the compressor is again started. Especially in refrigeration applications, the fan would carry the liquid water with the air and could do some damage to goods within the space to be conditioned. Thus, in at least some refrigerant cycles, the compressor is started at the end of defrost cycle but the evaporator fan stays off for an additional period of time. At some point soon after initiation, the refrigerant in the evaporator freezes the remaining moisture. At this point, the fan is started.

There are problems with the above prior art method of operation. In particular, the expansion device that is upstream of the evaporator is typically controlled to meter the amount of refrigerant being delivered to the evaporator dependent on the temperature at the evaporator. During the period soon after the end of the defrost cycle, even in refrigerant cycles where the fan begins to operate immediately, the evaporator coils are relatively hot. At the end of the defrost cycle, the metal evaporator coils have typically been heated by the heater coils.

A control for the expansion device would interpret this hot evaporator as being indicative of a need for increased refrigerant flow. Thus, there is a concern with two much refrigerant being delivered through the expansion device into the evaporator at the end of a defrost cycle. This increased refrigerant flow could lead to flooding in the evaporator and compressor, which is undesirable.

SUMMARY OF THE INVENTION

In a disclosed embodiment of this invention, a control for the expansion device moves into a post-defrost control mode once the defrost cycle is terminated. In one embodiment, the control moves the expansion device to a stored value at the end of the defrost cycle. The stored value may be a value stored at the initiation of the defrost cycle, or any other stored value. As an example, the value may be determined in a laboratory, and stored within the control. The expansion device is then run at that predetermined value for a period of time until the evaporator can return to a steady state temperature. At that time, the control can switch back to active control of the expansion device.

These and other features of the present invention can be best understood from the following specification and drawings, the following of which is a brief description.

DETAILED DESCRIPTION OF THE PREFERRED EMBODIMENT

Figure 1:
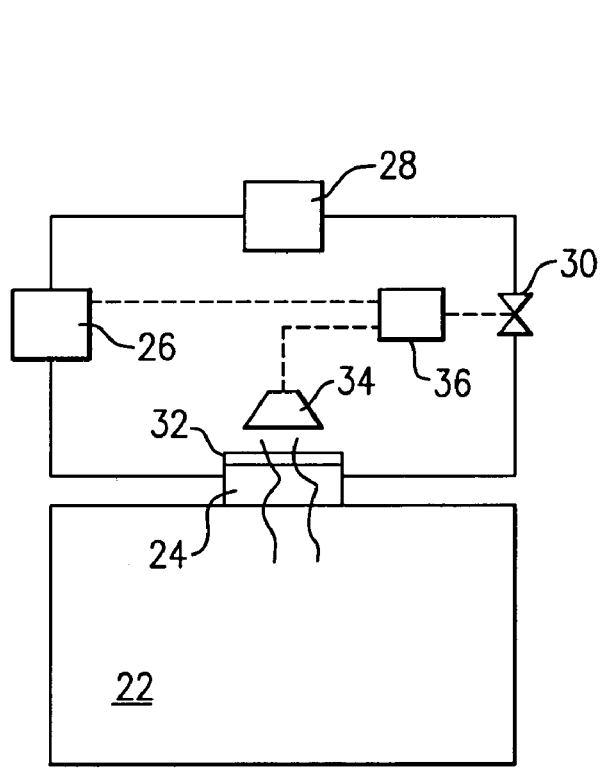
FIG. 1 is a schematic view of a refrigerant cycle incorporating the present invention.

A refrigerant cycle 20 is illustrated in FIG. 1 for conditioning an environment 22. Environment 22 may be a refrigerated chamber, or any other environment to be cooled. An evaporator 24 is positioned to condition the air within the environment 22. Downstream of the evaporator 24 is a compressor 26. A condenser 28 is positioned downstream of the compressor 26, and an expansion device 30 is positioned downstream of the condenser 28. As shown, a heater element 32 is associated with the evaporator 24. An air handler or fan 34 passes air over the evaporator 24 and into the environment 22.

A control 36 controls the compressor 26, the fan 34, the heater element 32 and the expansion device 30 in a first embodiment. When it is determined that a defrost cycle is desirable, the compressor 26 and fan 34 are stopped. The heater 32 is initiated, and the coils of the evaporator 24 are defrosted. At the end of a predetermined period of time, the defrost cycle is ended. At that time, the compressor 26 is again started. Refrigerant passes through the refrigerant cycle into the evaporator 24. This cooler refrigerant freezes any remaining moisture on the evaporator coil. At the time of start-up, the coils of the evaporator 24 are typically quite hot. As mentioned above, at the initiation, and dependent upon the environment 22 to be conditioned, the fan 34 may not be started immediately, but its start may be delayed for a period of time after start of the compressor 26.

Control 36 is operable to control the opening of the expansion device 30 and meter the amount of refrigerant delivered to the evaporator 24. In an electronically controlled expansion device such as shown in FIG. 1, the metered amount is dependent upon the temperature of the evaporator 24, and the amount increases as the temperature of the evaporator 24 increases. Since the evaporator 24 will be at a high temperature when the defrost cycle has initially ended, the control 36 might determine that a large amount of refrigerant should be metered by the expansion device 30 and delivered to the evaporator 24. As mentioned above, this could have some undesirable consequences.

Figure 2:
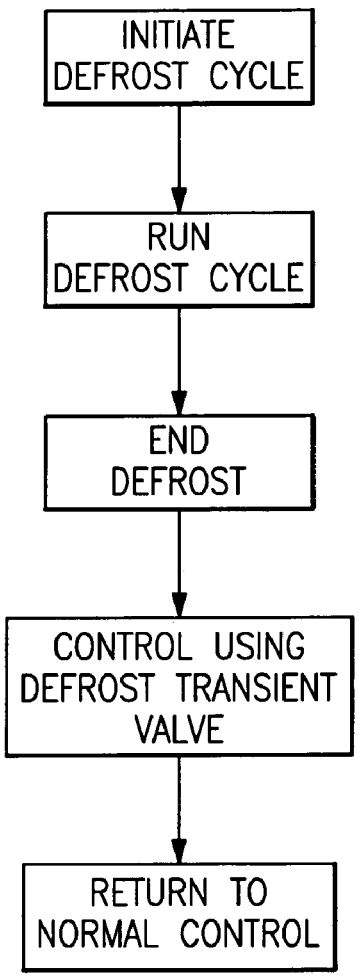
FIG. 2 is a flowchart of the present invention.

A disclosed method of providing a transient control at the end of a defrost cycle is shown in the FIG. 2 flowchart. A determination is made that a defrost cycle should be initiated. In one embodiment, at the time defrost is initiated by stopping the compressor 26 and the fan 34, the control 36 stores the position or size of the expansion device 30. The defrost cycle then begins for a period of time. When the defrost cycle has ended, the control 36 will again actuate at least the compressor 26, and the fan 34 either immediately, or within a period of time after the initiation of running of the compressor 26.

Under either condition, the control 36 also controls the electronic expansion device 30 independent of the temperature of the evaporator 24 for a period of time. The period of time may be selected to last until the evaporator temperature can be expected to return to a normal value, say on the order of 3 to 8 minutes. In a first embodiment, the previously stored position of the expansion device 30 at the initiation of the defrost cycle is utilized as a default value for the expansion device 30 until a steady state temperature can be reached in the evaporator 24. That is, the control 36 returns the expansion device to its previous position, and maintains it at this previous position. In this way, even though the evaporator 24 is hot, an undue amount of refrigerant is not delivered to the evaporator 24, and flooded starts are avoided.

In another embodiment, a defrost transient position for the expansion device 30 can be determined experimentally, or from any other period of time during operation of the refrigerant cycle 20.

Figure 3:
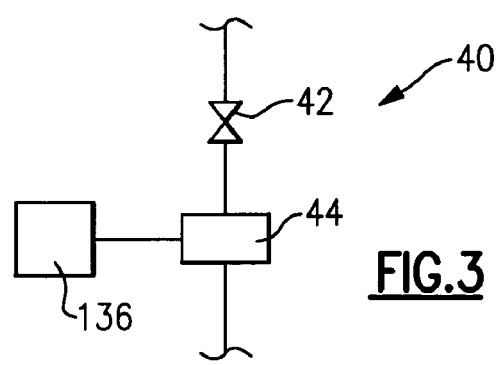
FIG. 3 shows a second embodiment of the present invention.

As shown in FIG. 3, in another embodiment 40, the expansion device 42 is mechanical. As is known, mechanical expansion devices 42 operate by a pressure bulb and temperature relationship. That is, while the amount of refrigerant passing through the mechanical expansion device 42 does change with changing refrigerant conditions, the expansion device 42 is not controlled by an electronic controller. In this embodiment, a solenoid valve 44 is associated with control 136, and the control 136 moves the solenoid valve 44 to restrict the flow of refrigerant through the expansion device 42. The amount of restriction may be determined in a similar to that with regard to the first embodiment.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant cycle comprising:
   a compressor delivering refrigerant to a condenser, refrigerant passing from said condenser to an expansion device, said expansion device having a variable orifice size to meter refrigerant flowing through said expansion device, refrigerant flowing though said expansion device passing downstream to an evaporator, the amount of refrigerant passing to said evaporator being at least partially dependent upon an evaporator condition under normal operating conditions, and refrigerant passing from said evaporator back to said compressor;
   a defrost element provided at said evaporator; and
   a control for at least said compressor and said defrost element, said control further being operable to control the amount of refrigerant passing to said evaporator, said control being operable to initiate a defrost cycle by actuating said defrost element and stopping said compressor, said control further being operable to end said defrost cycle and move said refrigerant cycle into a defrost transient mode, and said control controlling an amount of refrigerant passing to said evaporator by utilizing a defrost transient value at the end of the defrost cycle.

2. The refrigerant cycle as set forth in claim 1, wherein said control stores a previous position of said expansion device as said defrost transient value.

3. The refrigerant cycle as set forth in claim 1, wherein said defrost transient value is independent of any refrigerant condition at the end of the defrost cycle.

4. The refrigerant cycle as set forth in claim 1, wherein said defrost element is a heater element.

5. The refrigerant cycle as set forth in claim 1, wherein an air handler passes air over said evaporator and into an environment to be conditioned, said air handler being stopped during said defrost cycle.

6. The refrigerant cycle as set forth in claim 5, wherein said air handler is started at the end of defrost cycle for a period of time after said compressor is started.

7. The refrigerant cycle as set forth in claim 1, wherein said expansion device is an electronically controlled expansion device, and said control providing said defrost transient value to said expansion device.

8. The refrigerant cycle as set forth in claim 1, wherein said expansion device is mechanically controlled, said control controlling a valve positioned upstream of said expansion device with said valve being operable to restrict flow of refrigerant from said expansion device to said evaporator to said defrost transient value.

9. A method of operating a refrigerant cycle comprising the steps of:
   providing a compressor delivering refrigerant to a condenser, refrigerant passing from said condenser to an expansion device, said expansion device having a variable orifice size to meter refrigerant flowing through said expansion device, refrigerant flowing though said expansion device passing downstream to an evaporator, the amount of refrigerant passing to said evaporator being at least partially dependent upon an evaporator condition under normal operating conditions, and refrigerant passing from said evaporator back to said compressor, a defrost function provided at said evaporator;
   initiating a defrost cycle by activating a defrost element and stopping said compressor;
   ending said defrost cycle by stopping said defrost element and starting said compressor, moving said refrigerant cycle into a defrost transient mode; and
   metering refrigerant passing to the evaporator based upon a previously stored defrost transient value.

10. The method as set forth in claim 9, wherein said control storing a previous position of said expansion device as said defrost transient value.

11. The method as set forth in claim 9, wherein an air handler passes air over said evaporator and into an environment to be conditioned, said air handler being stopped during said defrost cycle.

12. The method cycle as set forth in claim 11, wherein said air handler is started at the end of defrost cycle for a period of time after said compressor is started.

13. The method as set forth in claim 9, wherein said expansion device is an electronically controlled expansion device, and said control providing said defrost transient value to said expansion device.

14. The method as set forth in claim 9, wherein said expansion device is mechanically controlled, said control controlling a valve positioned upstream of said expansion device with said valve restricting flow of refrigerant from said expansion device to said evaporator based upon said defrost transient value.

* * * * *